(12) United States Patent
Sehlin et al.

(10) Patent No.: US 6,383,350 B1
(45) Date of Patent: May 7, 2002

(54) THIN FILM MODULAR ELECTROCHEMICAL APPARATUS AND METHOD OF MANUFACTURE THEREFOR

(75) Inventors: Scott R. Sehlin, Bettendorf; Vincent L. Sprenkle, Davenport, both of IA (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 09/626,794

(22) Filed: Jul. 26, 2000

(51) Int. Cl.⁷ .............................................. C25B 11/00
(52) U.S. Cl. ...................... 204/286.1; 204/283; 429/30; 429/31; 429/34; 429/40; 429/41; 429/44
(58) Field of Search .............................. 429/30, 31, 34, 429/40, 41, 44; 204/286.1, 283

(56) References Cited

U.S. PATENT DOCUMENTS

| | | | |
|---|---|---|---|
| 5,158,837 A | * 10/1992 | Misawara et al. ............ 429/34 |
| 5,453,330 A | * 9/1995 | Kawasaki et al. ............ 429/40 |
| 5,871,624 A | 2/1999 | Crome ........................ 204/286 |
| 5,985,113 A | 11/1999 | Crome et al. ................ 204/286 |
| 6,080,501 A | * 6/2000 | Kelley et al. ................. 429/31 |

* cited by examiner

Primary Examiner—Bruce F. Bell
(74) Attorney, Agent, or Firm—Lowe Hauptman; Gilman & Berner, LLP

(57) ABSTRACT

A method of manufacturing a thin film electrochemical apparatus is disclosed. A near net shape ceramic element is molded including a planar base region and a plurality of tubular regions. The planar base region is infiltrated with a non-conductive material. Each of the tubular regions is infiltrated with a porous conductive material. A porous catalytic electrode material is applied onto the infiltrated regions to form one of a cathodic and anodic surface. A ceramic electrolyte coating is deposited onto the porous catalytic electrode material. A porous catalytic electrode material is applied onto the deposited ceramic electrolyte coating. A porous conductive material is deposited onto the porous catalytic electrode to form the other of the cathodic and anodic surface.

7 Claims, 7 Drawing Sheets

THIN FILM MODULAR ELECTROCHEMICAL APPARATUS AND METHOD OF MANUFACTURE THEREFOR

FIELD OF THE INVENTION

The present invention relates generally to electrochemical devices, and more specifically, to a method and article using thin electrolyte coatings on a ceramic support structure. More specifically, the present invention relates to a method of forming a near net shape ceramic support structure and depositing a thin electrolyte layer on one surface of the ceramic support structure. Even more A specifically, the present invention relates to a ceramic support structure having a plurality of thin tubular walls in which the electrolyte layer is in the range of approximately $10\mu$–$100~\mu$m.

BACKGROUND OF THE INVENTION

The ceramic oxygen generators disclosed in U.S. Pat. Nos. 5,871,624 and 5,985,113, which are hereby incorporated by reference in their entirety into the instant specification, overcame many of the limitations inherent in previous approaches for electrochemical devices utilizing an oxygen-conducting electrolyte. The integral base described in U.S. Pat. No. 5,871,624 provided a simplified, low resistance method for electrical interconnection between individual electrochemical elements. The base 14 also enables the formation of a hermetic chamber, separating the atmospheres at the anodic and cathodic surfaces from each other, for a large number of individual elements with a single seal joining like materials. The disclosed arrangement, unlike planar stack configurations, has shown the ability to withstand internal pressures greater than 1200 psi at room temperature and to generate oxygen at over 45 psi outlet pressure. Such pressures are necessary for integration of ceramic oxygen generator systems (COGS) with pulse dosing and anesthesia devices for medical applications.

U.S. Pat. Nos. 5,871,624 and 5,985,113 disclose that the ceramic element also acted as the electrolyte. The support structure includes a base portion (also called a tube support portion in the '113 patent) and a plurality of tubes. The electrical efficiency of the design was limited by the thickness of the tubular walls of the ceramic element that could be formed by existing technologies such as powder injection molding.

SUMMARY OF THE INVENTION

An object of the present invention is to improve the electrical efficiency of an electrochemical apparatus by forming thin electrolyte and electrode films onto a support structure.

Another object of the present invention is to provide a tubular region of the support structure which is electrically conductive and permeable to oxygen-containing gasses.

Another object of the present invention is to provide a planar (manifold) region of the support structure which is not electrically conductive nor permeable to oxygen-containing gasses.

Still another object of the present invention is to provide a method of manufacturing a thin film electrochemical apparatus.

Yet another object of the present invention is to reduce the wall thickness of the electrolyte portion of the ceramic element.

Still another object of the present invention is to form an electrochemical apparatus without vias.

These and other objects of the present invention are achieved by a method of manufacturing a thin film electrochemical apparatus. A near net shape ceramic element is molded including a planar base region and a plurality of tubular regions. The planar base region is infiltrated with a non-conductive material. Each of the tubular regions is infiltrated with a porous conductive material. A porous catalytic electrode material is applied onto the infiltrated regions to form one of a cathodic and anodic surface. A ceramic electrolyte coating is deposited onto the porous catalytic electrode material. A porous catalytic electrode material is applied onto the deposited ceramic electrolyte coating. A porous conductive material is deposited onto the porous catalytic electrode to form the other of the cathodic and anodic surface.

The foregoing and other objects of the present invention are achieved by a method of manufacturing a thin film electrochemical apparatus. A near net shape ceramic element is molded including a base region and a plurality of tubular regions. A portion of each of the base regions is masked to form a first base region and a second base region. A porous conductive material is deposited onto the plurality of tubular regions and the first and the second base regions. A porous catalytic electrode material is first applied onto the deposited porous conductive material to form one of a cathodic and anodic surface. A dense ceramic electrolyte is deposited onto the applied catalytic electrode material. A porous catalytic electrode material is deposited onto the deposited ceramic electrolyte to form the other one of the cathodic and anodic surface, and depositing a porous conductive material onto the porous catalytic electrode to electrically connect the second applied catalytic electrode over the first base region to the porous conductive material on the second base region.

The foregoing and other objects of the invention are achieved by a thin film electrochemical apparatus, including a ceramic support structure including a planar base region and a plurality of tubular regions. An electrically conductive region is formed in each said plurality of tubular regions. The planar region is electrically non-conductive and provides a hermetic barrier. A first catalytic electrode layer is formed on a surface of each of the tubular regions. An electrolytic layer is adjacent to the first catalytic electrode layer. A second catalytic electrode layer is adjacent to the electrolytic layer.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

BEST MODE FOR CARRYING OUT THE INVENTION

Figure 1:
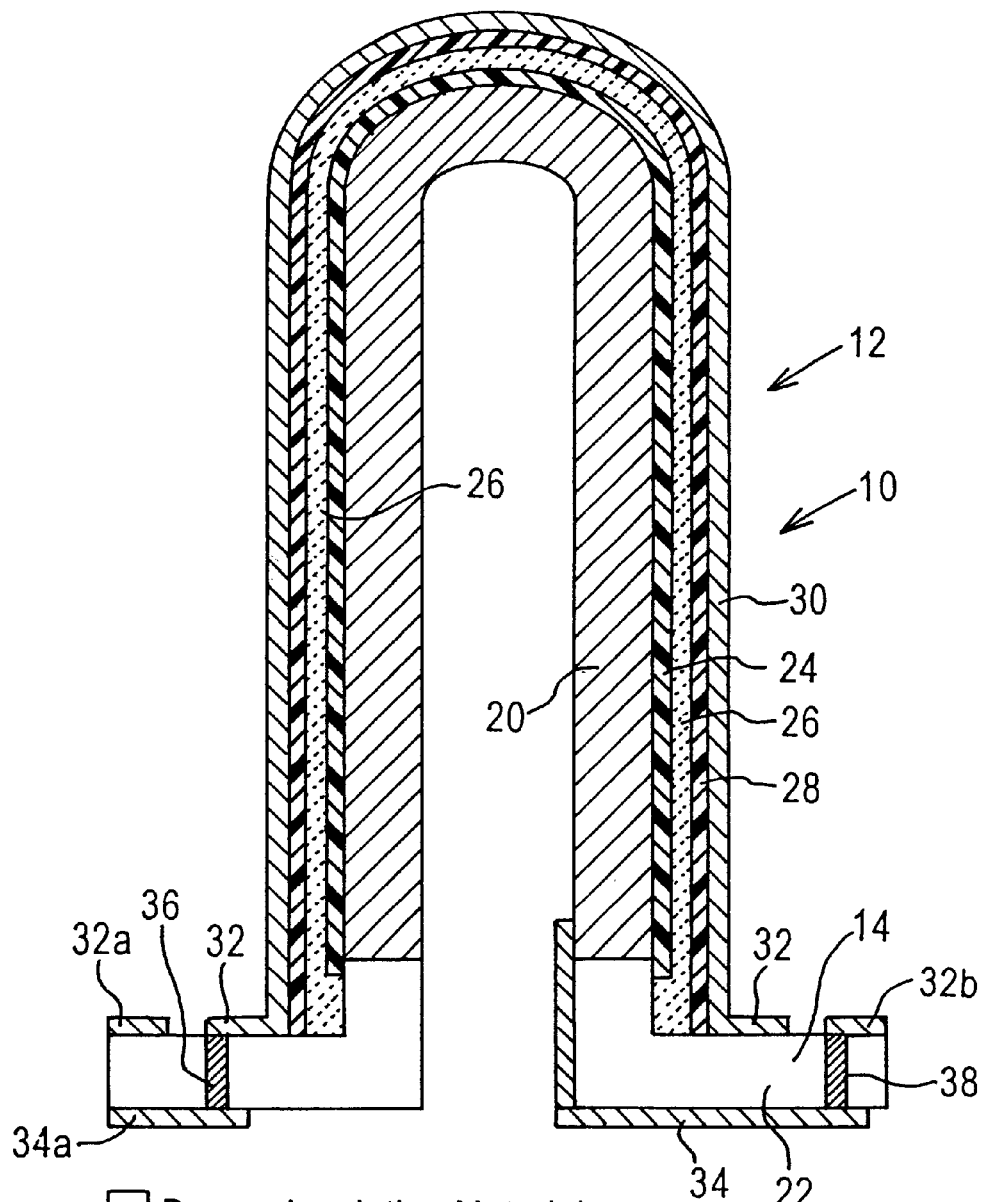
FIG. 1 is a cross-sectional side view of a thin film electrochemical apparatus according to the present invention including tubular portions and a base portion.

A cross-sectional view of a thin film modular electrochemical apparatus, generally indicated at 10, and manufactured according to the present invention is depicted in FIG. 1. As depicted, the thin film modular electrochemical apparatus 10 include a tubular region 12 extending from a planar base region 14. For purposes of explanation, a completed thin film electrochemical apparatus 10 according to a first embodiment of the invention is illustrated in FIG. 1 and the steps for manufacturing the thin film electrochemical apparatus are illustrated in FIGS. 2A–2E. Only one tubular region 12 is illustrated for simplicity although it should be understood that an array of tubular regions arranged in a grid and injection molded as a unitary ceramic element would be used in the present invention. A support structure 100 (FIG. 2A) can be formed by injection molding a mixture of electrically insulating ceramic powder and a polymeric binder compound, yielding a near net shape article including a plurality of holes 16, 18 found in the planar base region 14 and exgtending from an upper surface thereof to a lower surface thereof. Advantageously, the support structure 100 as injection molded does not have to be machined. The resulting article or support structure 100 undergoes binder removal and sintering procedures to yield a porous article that is not electrically conductive. The porous article support structure 100 would preferably be composed of aluminum oxide, but could also be formed from any porous, electrically insulating material with a thermal expansion coefficient similar to that of the ceramic electrolyte that is chemically stable under the thin film fabrication and device operating conditions. Aluminum oxide is the preferred material for the structure depicted in FIGS. 1 and 2A, but other electrically insulating materials may also be employed.

Figure 2A:
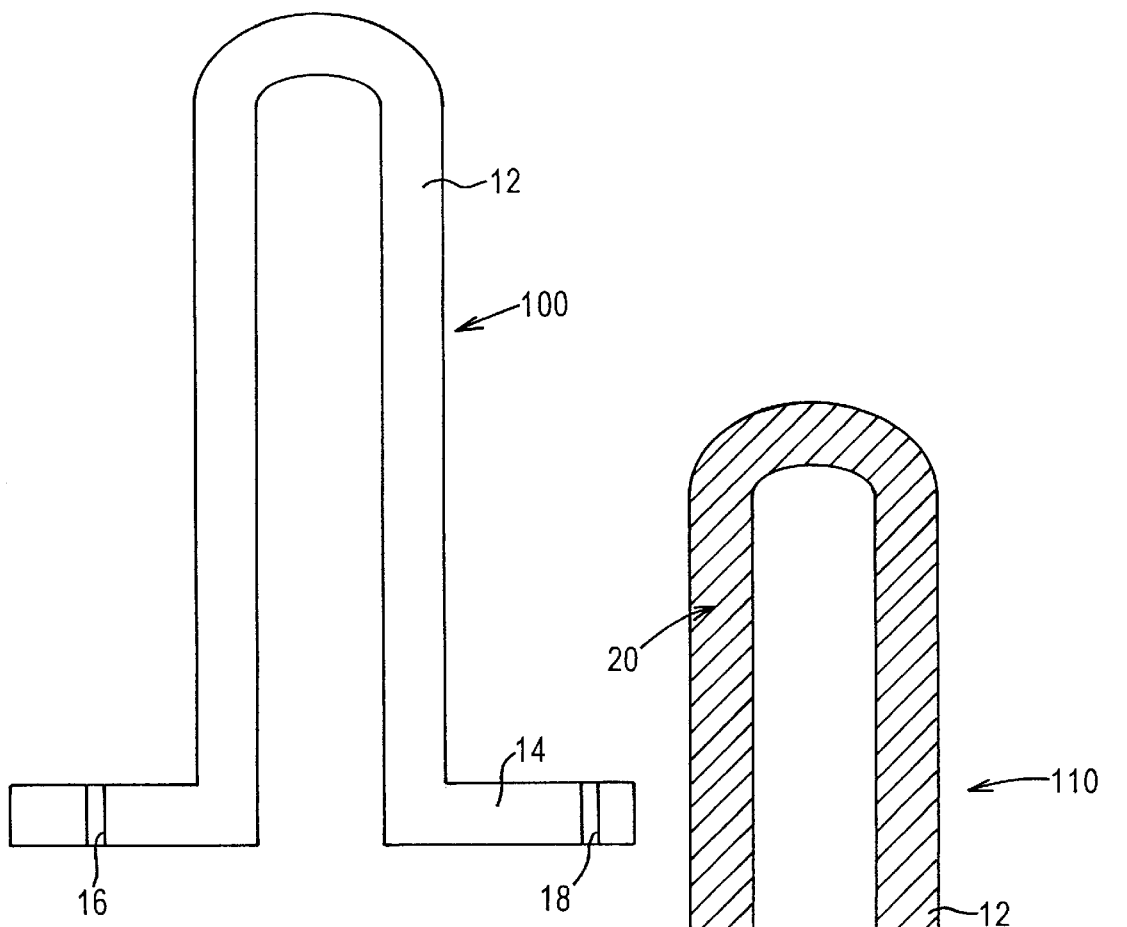
FIG. 2A is a portion of a near net shaped article.
Figure 2B:
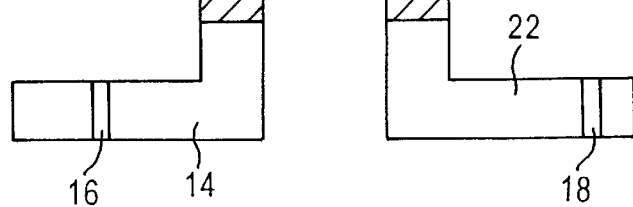
FIG. 2B depicts a tubular region 12 having been infiltrated with a conductive material for the article illustrated in FIG. 2A.

As depicted in FIG. 2B, the tubular regions 12 of the porous support structure 100 are infiltrated for a majority of their length but terminating before the base region 14 to form an infiltrated tubular region 110. The infiltrated tubular region 110 allows electrical current to pass from the interior to the exterior wall of each tube with minimal resistance. The thickness of the region 110 is approximately 300–500 $\mu$m. Silver is the preferred material, but gold, platinum, palladium, or alloys including the aforementioned metals could also be used. Open porosity is maintained in infiltrated tubular regions 110 forming a conductive region to allow passage of oxygen to or from the thin film electrolyte. The planar base region 14 of the module 10 is infiltrated with an insulating material 22 to a state of closed porosity, forming the required electrical insulation and providing for a hermetic barrier between the gas species present at the anodic and cathodic surfaces as described below.

Figures 2C, 2D:
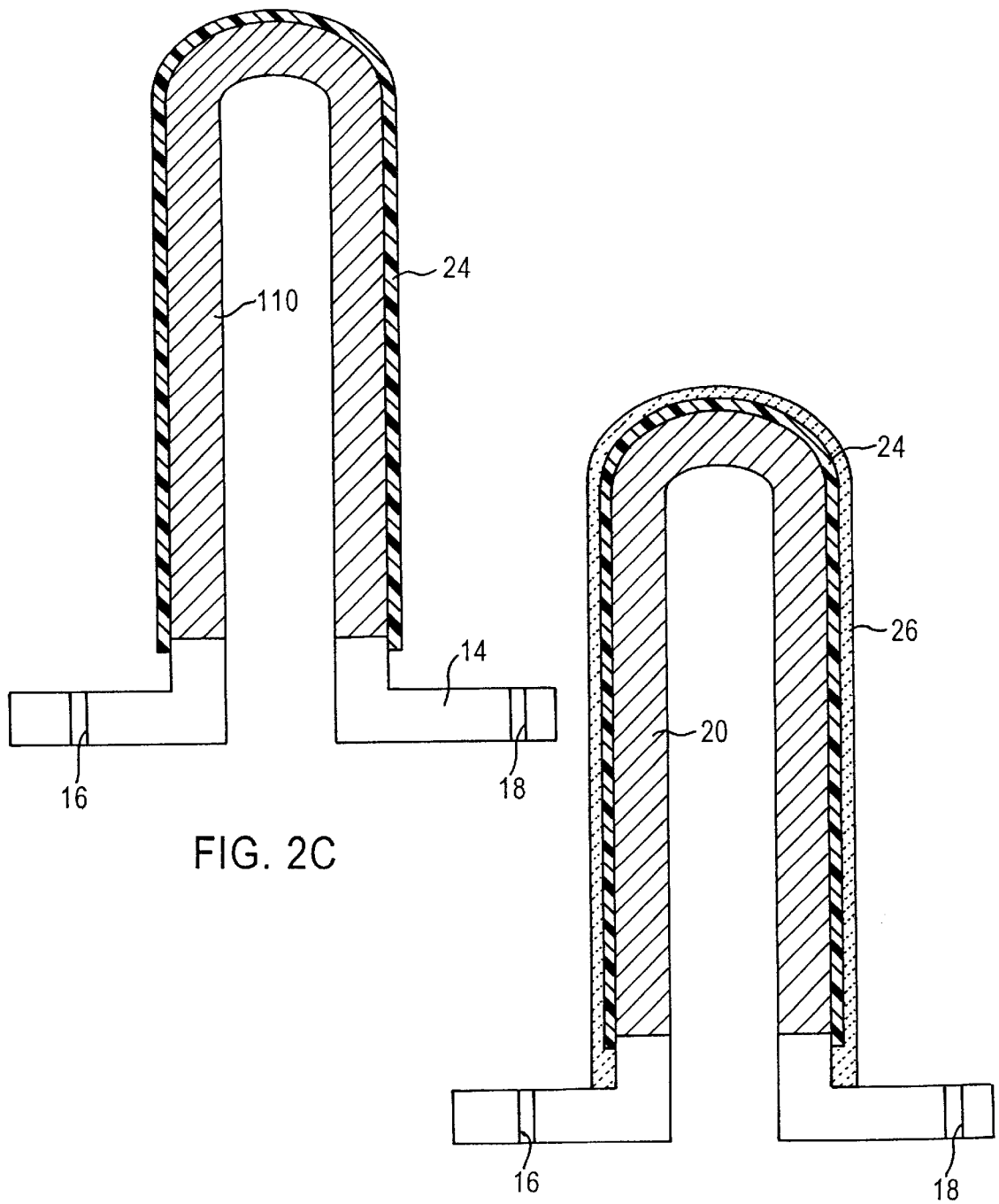
FIG. 2C depicts a catalytic electrode coating having been applied over the portion of the tubular region for the article illustrated in FIG. 2A.
FIG. 2D depicts an electrolytic layer having been deposited over the catalytic electrode for the article illustrated in FIG. 2A.

As depicted in FIG. 2C, a catalytic electrode 24 is formed by applying a coating over the infiltrated tubular region 110. The catalytic electrode 24 extends beyond the infiltrated tubular region 110. As depicted in the FIGS., the catalytic electrode 24 is formed on the outer surface of the tubular regions 12 although the catalytic electrode 24 can be applied to either the inner or outer surface of the porous, conductive support tube 12. If the catalytic electrode 24 is formed on the inner surface, then the other coatings would also be applied on the inner surface as well. The catalytic electrode 24 is preferably of a composition $Ln_{1-x}A_xBO_3$ where Ln is a lanthanide ion or mixture of such ions, A is Ca, Sr, or Ba and B is one or more transition metal ions such as Cr, Mn, Co, Ni and $0<x<1.00$. The catalytic electrode 24 could also be composed of a precious metal such as those mentioned above in the infiltration step or a mixture of a precious metal and the preferred catalytic electrode. The catalytic electrode 24 could also be composed of a mixture of the ceramic electrolyte and the preferred electrode composition.

As depicted in FIG. 2D, an electrolyte layer 26 is formed by applying a dense (>95% of theoretical density) layer over the catalytic electrode 24, extending past the catalytic electrode 24 to make direct contact with the dense, insulating base 14. Preferred electrolyte materials include yttria stabilized zirconia, doped ceria compositions that are not electrically conductive, bismuth oxides, and lanthanum gallate based electrolytes. Contact between the dense electrolyte 24 and the base 14 is necessary to isolate the interior and exterior gas species from each other.

Figure 2E:
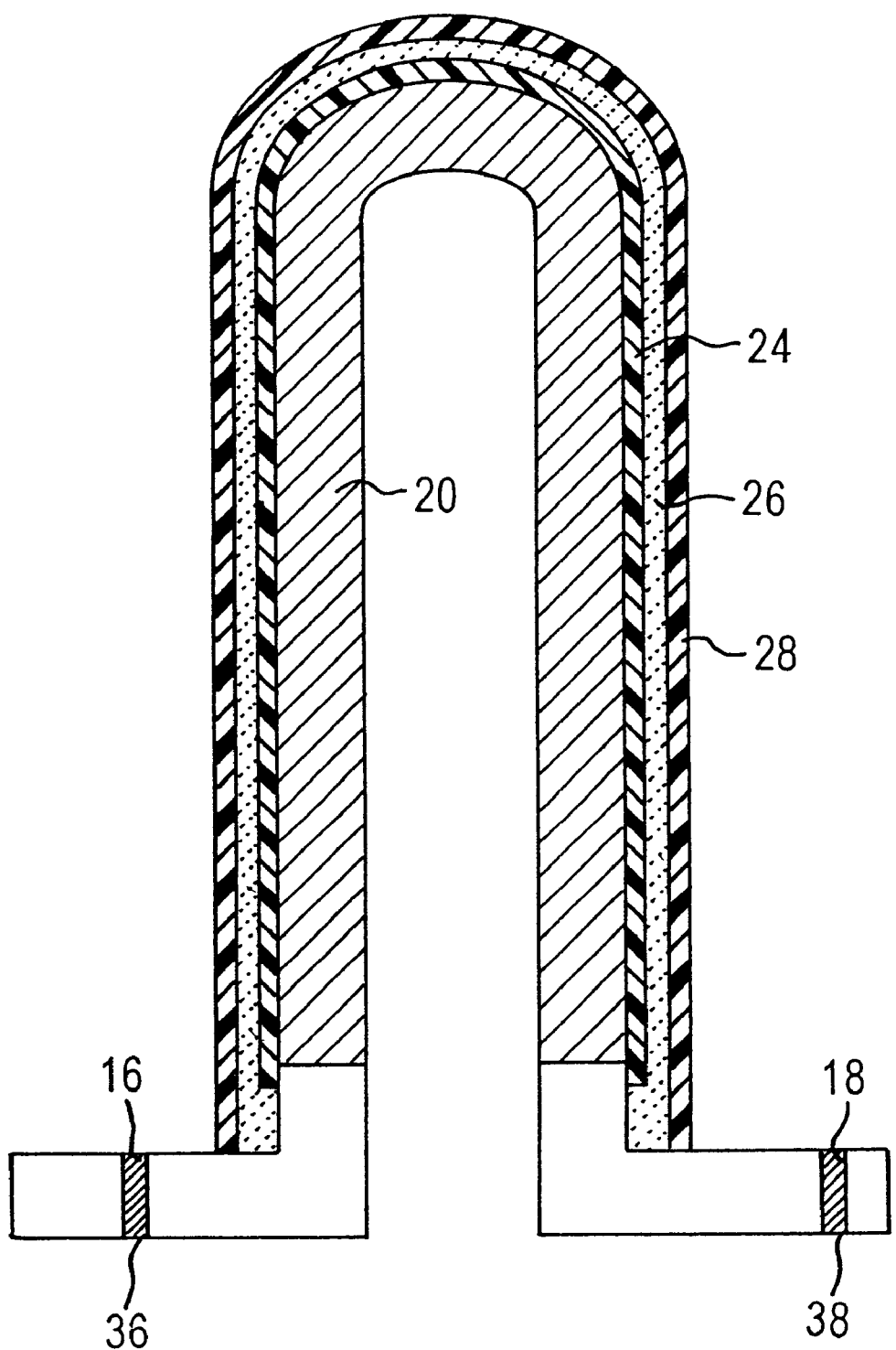
FIG. 2E depicts a second catalytic electrode layer having been deposited over the electrolyte layer for the article illustrated in FIG. 2A.

As depicted in FIG. 2E, another catalytic electrode 26 is applied to the electrolyte 24 to cover the entire outer surface of the tubular regions 12. As depicted in FIG. 2E, but can take place anytime during the described coating process, the holes 16, 18 are filled with an electrically conductive material to form vias 36, 38.

Finally a porous, conductive layer 30 is applied which extends onto the base region 14 as shown in FIG. 1 to facilitate electrical contact between the interior porous, conductive layer extends onto the base region 14 as shown in FIG. 1 to facilitate electrical contact between the interior surface of one tube and the exterior surface of an adjacent tube through an electrical via 36, 38 in the base region described in detail below.

Referring back to FIG. 1, the porous conductive layer 30 covers the entire catalytic electrode 28 and portions of the planar base portion 14. The porous conductive layer 30 extends horizontally on an upper surface of the planar base portion 22 and forms a ring 32 horizontally spaced from rings 32a and 32b which are formed on a left tube 12a (not shown) and a right tube 12b (not shown). A portion of the conductive layer 30 which is deposited on the planar base region 14 and the inner surface of the tubular regions 12 on support structure 100 is an L-shaped portion 34 as depicted in FIG. 1 which connects an inner surface of the tube 12 to a bottom end of via 38 as depicted in FIG. 1. A tube 12b (not shown) located to the right of tube 12 has the ring 32b connected to a top end of the via 38. Tube 12 has the ring 32 connected to a top end of the via 36. In this manner, a series electrical connection is established between adjacent tubes 12a, 12, 12b. The L-shaped portion 34 of tube 12a (not shown) is connected to a bottom end of via 36.

Techniques for application of the required coatings include slurry deposition methods, such as spraying and dipping, plasma spraying, vapor deposition and plating methods. The conductive vias 36, 38, which forms a series electrical connection between adjacent tubular generator elements, can be formed by a wire insertion process or other through-hole plating techniques. Critical considerations in selection of coating methods include achieving the necessary porosity or lack of porosity for each layer, and for existing layers to survive the process conditions encountered in subsequent coating steps. Therefore, utilization of several different coating methods as successive layers are deposited may be required to produce the electrochemical apparatus 10.

Figure 3:
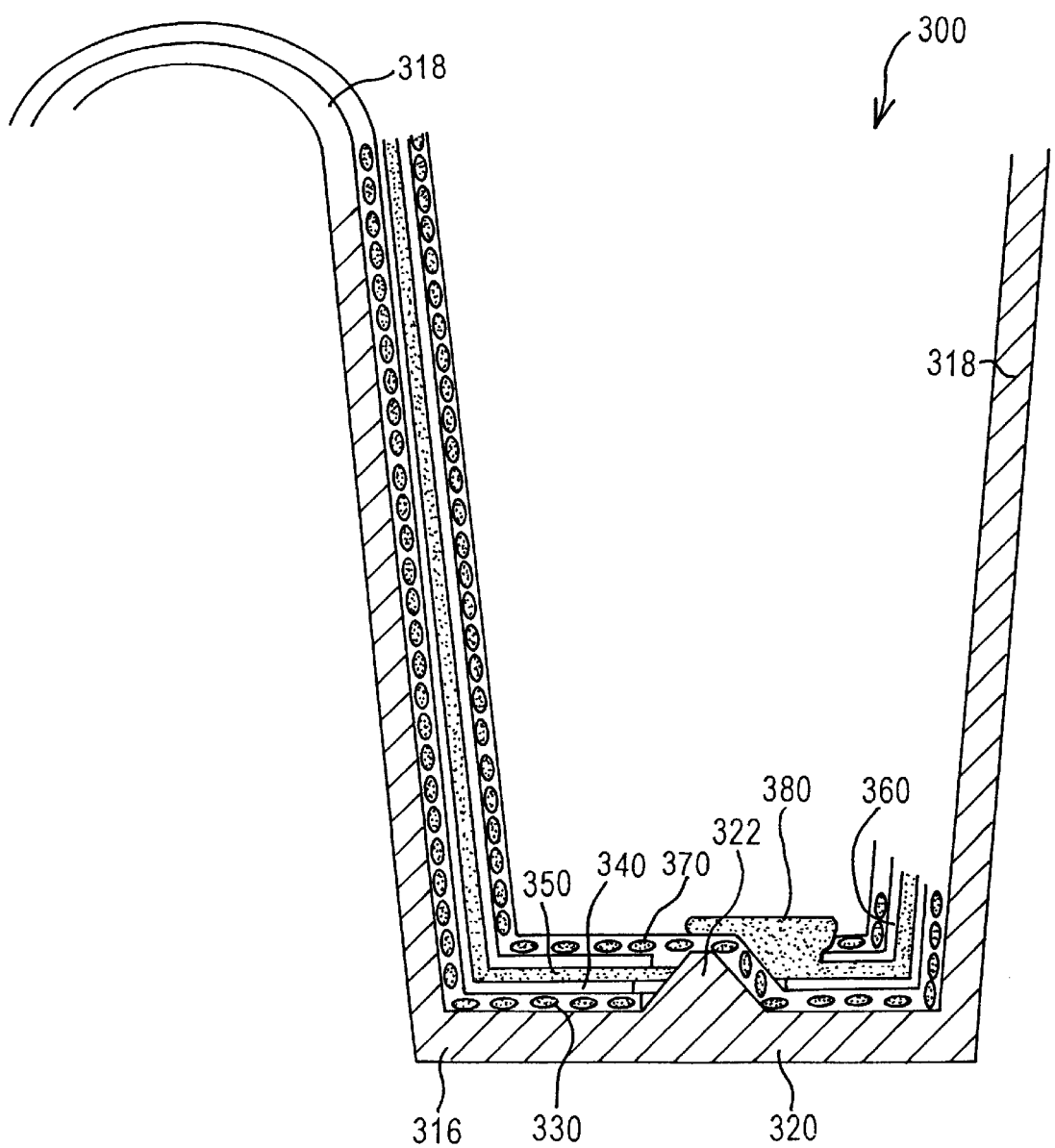
FIG. 3 is a cross-sectional side view of a second embodiment of a thin film electrochemical apparatus according to the present invention.

In another embodiment of the device depicted in FIG. 3, the entire support structure 316 is electrically insulating and porous. The support structure 316 includes a plurality of tube portions 318 arranged in a grid array connected by base regions 320. The base region 320 has a projecting portion 322 having a V-shape with angled surfaces 337, 339 joined by a flat top surface 338. For purposes of explanation, a completed thin film electrochemical apparatus 300 according to a second embodiment of the present invention is illustrated in FIG. 3 and the steps for manufacturing the thin film electrochemical apparatus are illustrated in FIGS. 4A–4E. Only two tubular regions 318 are depicted for simplicity although it should be understood that an array of tubular regions arranged in a grid and injection molded as a unitary ceramic element would be used in the present invention. Advantageously, the second embodiment does not require vias and does not require any secondary machining operations to the ceramic element. The electrochemically active materials are applied to either the interior or exterior of the porous support 116 structure as follows.

Figure 4A:
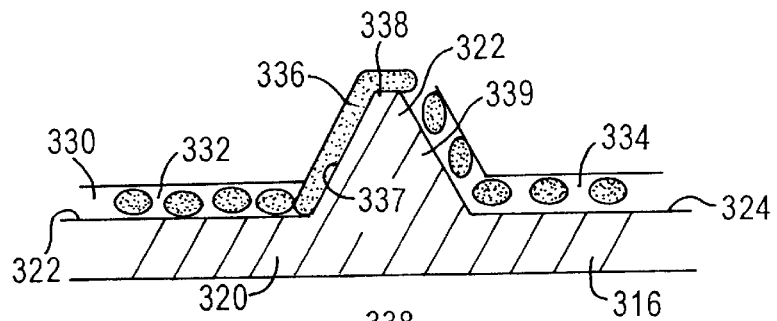
FIG. 4A is an illustration of using the mask during internal current collector deposition for the article illustrated in FIG. 3.

As depicted in FIG. 4A, a mask 336 is placed on surfaces 337 and 338. Then a porous, conductive material 120 is deposited as layer 330 onto upper surfaces 322 and 324 of the base region 316 to form a porous conductive material portion 332 on the first side 322 of the base region 320 and a porous conductive material portion 334 on the second side 324 of the base region 320. The second porous conductive material portion 334 covers surfaces 339 and 324. The first porous material portion 332 covers most of surface 322 but is spaced from surface 339.

Figure 4B:
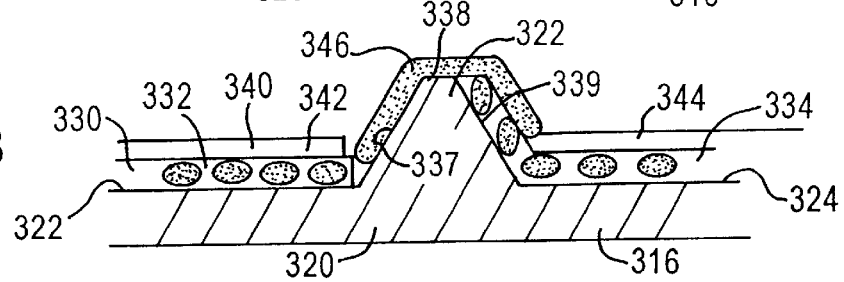
FIG. 4B is an illustration of using the mask during internal electrode deposition for the article illustrated in FIG. 3.

As depicted in FIG. 4B, the mask 336 is modified to become mask 346 to cover the portion of the porous conductive material covering surface 339. Then an internal electrode coating is applied to the conductive material as a layer 340 to form an electrode 342 and an electrode 344 covering first side 322 and second side 324, respectively. The electrode 342 is spaced from inwardly from an end of the first porous material portion 334 to form a staggered layering.

Figure 4C:
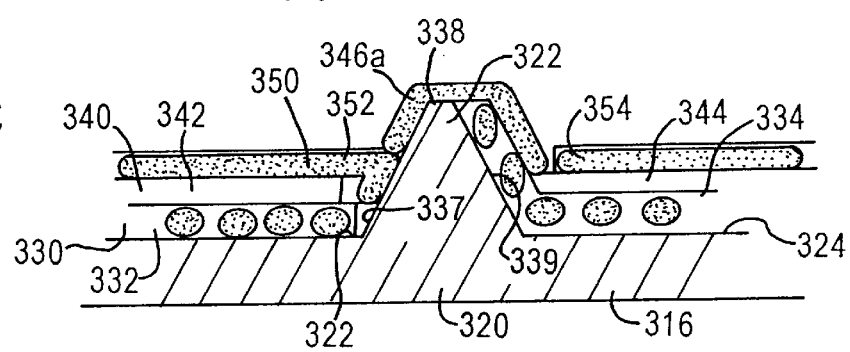
FIG. 4C is an illustration of using the mask during electrolyte deposition for the article illustrated in FIG. 3.

As depicted in FIG. 4C, the mask 346 is modified to become mask 346a to reduce its length on surface 337 to allow for electrolyte deposition. Similarly, the mask 346a also shortened on surface 339 to allow for the electrolyte deposition. As depicted in FIG. 4C, an electrolyte layer is applied onto the catalytic electrode layer to form an electrolyte layer 340. The portion covering the electrode 342 is electrolyte layer 352 and the portion covering the electrode 344 is electrolyte portion 354. Electrolyte portion 352 extends downwardly along surface 337 as depicted in FIG. 4C.

Figure 4D:
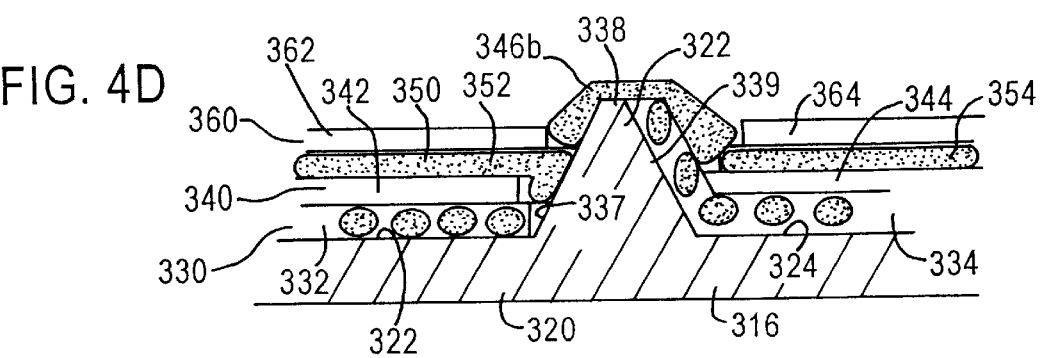
FIG. 4D is an illustration of using the mask during external electrode deposition for the article illustrated in FIG. 3.

As depicted in FIG. 4D, the mask is further modified as mask 346B in which the portion covering surface 337 is further shortened and thickened and the portion covering the second porous conductive material covering surface 339 is thickened to ensure that electrode 364 does not contact electrode 344 and that the electrode 362 does not contact the electrode 342. Then a second electro-deposition is performed forming a layer 360 having a first portion 362 and a second portion 364 covering electrolyte layers 352 and 354, respectively.

Figure 4E:
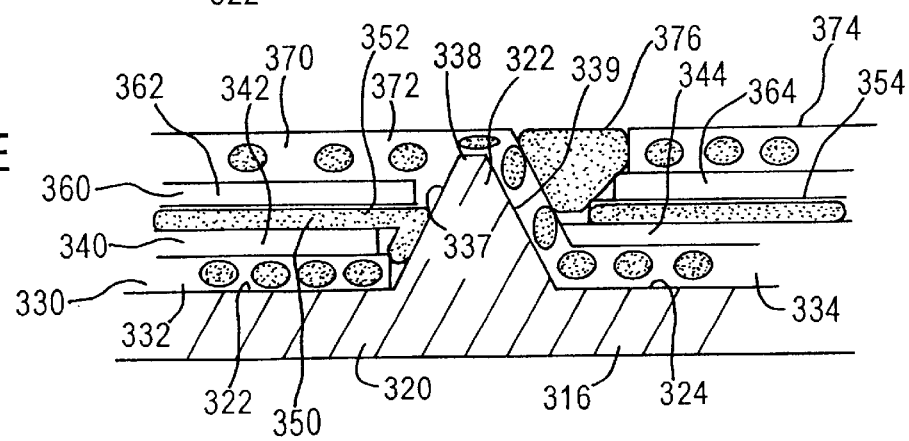
FIG. 4E is an illustration of using the mask during external current collector deposition for the article illustrated in FIG. 3.

As depicted in FIG. 4E, the mask 346B is removed from surfaces 338 and 339 and is further thickened over surface 339. Another layer of porous conductive material 120 is applied over electrodes 360 and 364 thereby connecting the second applied catalytic electrode 360 to the porous conductive material 334 on the second base region.

Mask 376 is then replaced with a glass seal 380 (FIG. 3) to ensure heimiticity.

At any time during the process, remaining sections of the porous supporting structure 316 are infiltrated or coated with a dense material to ensure that the chamber formed by the base region 318 is hermetic.

Coating application methods and preferred material selections for this embodiment are analogous to those described for the previous embodiment as shown in FIG. 1. In the base region, the electrical via is formed through masking and thin film deposition techniques. The formation of a hermetic chamber in the base region can be achieved by sealing the perimeter of the module with a dense, insulating material, such as a glass or ceramic slurry.

Figure 5:
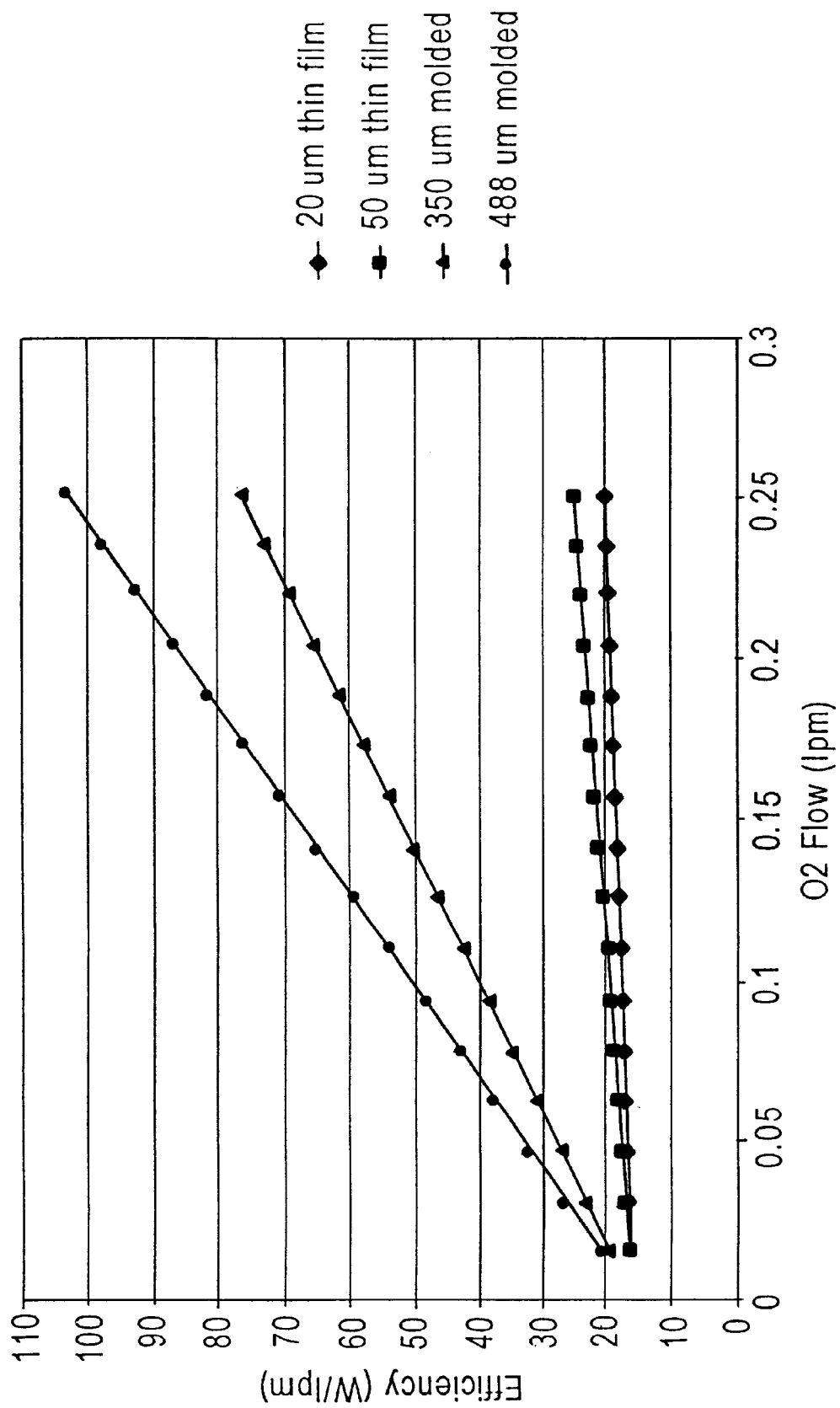
FIG. 5 is a graphic illustration of the projected electrical efficiency of the thin film electrochemical apparatus versus the electrochemical apparatus disclosed in U.S. Pat. Nos. 5,871,624 and 5,985,113.

The increased electrical efficiency that can be achieved utilizing either embodiment of the constructions disclosed herein would be beneficial in oxygen generating and fuel cell applications. The projected electrical efficiency for transport of oxygen across the ceramic electrolyte is shown for both thin film and molded wall oxygen generator modules (FIG. 5). In addition to increased efficiency, the thin film design offers other advantages, such as increased output per module if the coatings are applied on the exterior surface of the support structure and a weight reduction per module. The weight reduction would enhance the portability of devices built using this technology and decrease the time required to heat the modules to their operating temperature, which could range from 550–1000 degrees Celsius. Other electrochemical devices, such as sensors and fuel cells, could also achieve performance enhancements and cost reductions from the proposed design.

As depicted in FIG. 5, the inventors have determined that the thickness of the electrolyte layer needs to be approximately $10 \mu - 100 \mu m$ and show significant improvement over the structures in the '624 and '113 patents. Although others have attempted to reduce the thickness of the electrolyte layer to <10 $\mu m$ numerous problems result including the problem that it is difficult to form a continuous layer. At electrolyte thicknesses below 10 $\mu m$ other resistances such as the sheet resistance of the precious metal layer and the rate of the $O_2$ molecules breaking up are limitations to the electrical efficiency.

It will be readily seen by one of ordinary skill in the art that the present invention fulfills all of the objects set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

What is claimed is:

1. A thin film electrochemical apparatus, comprising:
    a ceramic support structure including a planar base region and a plurality of tubular regions;
    an electrically conductive region formed in each said plurality of tubular regions;
    said planar region being electrically non-conductive and providing an hermetic barrier;
    a first catalytic electrode layer formed on a surface of each of said tubular regions;
    an electrolyte layer adjacent to said first catalytic electrode layer;
    a second catalytic electrode layer adjacent to said electrolytic layer.

2. The thin film electrochemical apparatus of claim 1, wherein said ceramic support structure is made of aluminum oxide.

3. The thin film electrochemical apparatus of claim 1, wherein said electrically conductive region is approximately one-third electrically conductive material, one-third pores and one-third insulative material.

4. The thin film electrochemical apparatus of claim 1, wherein the catalytic electrode is $Ln_{1-x}A_x BO_3$ where Ln is a lanthanide ion or mixture of such ions, A is Ca, Sr or Ba and B is one or more transition metal ions including one or more of Cr, Mn, Co and Ni, and $0<x<1.00$.

5. The thin film electrochemical apparatus of claim 1, wherein said electrolytic layer is 95% of theoretical density.

6. The thin film electrochemical apparatus of claim 1, further comprising forming a plurality of electrically conductive vias in the planar base region.

7. The thin film electrochemical apparatus of claim 1, wherein the electrically conductive region is approximately 50 $\mu$m thick.

* * * * *

UNITED STATES PATENT AND TRADEMARK OFFICE
CERTIFICATE OF CORRECTION

PATENT NO. : 6,383,350 B1
DATED : May 7, 2002
INVENTOR(S) : Scott R. Sehlin and Vincent L. Sprenkle It is certified that error appears in the above-identified patent and that said Letters Patent is hereby corrected as shown below:

<u>Title page,</u>
Item [73], Assignee, please replace "Northrop Grumman Corporation, Los Angeles, CA, (US)" with -- Litton Systems, Inc., Woodland Hills, California, (US). --

Signed and Sealed this

Fifth Day of August, 2003

JAMES E. ROGAN
*Director of the United States Patent and Trademark Office*